US011774937B2

(12) United States Patent
Irwin et al.

(10) Patent No.: US 11,774,937 B2
(45) Date of Patent: Oct. 3, 2023

(54) PRODUCT PROCUREMENT WITH AUTOMATED QUALIFICATION

(71) Applicant: The Boeing Company, Chicago, IL (US)

(72) Inventors: Robert M. Irwin, Woodinville, WA (US); Kenneth Allen Hartsock, Marysville, WA (US)

(73) Assignee: The Boeing Company, Arlington, VA (US)

( * ) Notice: Subject to any disclaimer, the term of this patent is extended or adjusted under 35 U.S.C. 154(b) by 872 days.

(21) Appl. No.: 16/688,673

(22) Filed: Nov. 19, 2019

(65) Prior Publication Data

US 2021/0149365 A1 May 20, 2021

(51) Int. Cl.
*G06F 7/66* (2006.01)
*G05B 19/406* (2006.01)
*H04L 9/06* (2006.01)
*H04L 9/00* (2022.01)

(52) U.S. Cl.
CPC .......... *G05B 19/406* (2013.01); *H04L 9/0637* (2013.01); *G05B 2219/32039* (2013.01); *H04L 9/50* (2022.05)

(58) Field of Classification Search
CPC .................................................. G05B 19/406
USPC ......................................................... 700/109
See application file for complete search history.

(56) References Cited

U.S. PATENT DOCUMENTS

| 11,107,168 | B2 * | 8/2021 | Small | G06Q 20/389 |
| 2018/0276777 | A1 * | 9/2018 | Brillinger | G06Q 50/2057 |
| 2019/0036906 | A1 * | 1/2019 | Biyani | H04L 63/20 |
| 2019/0188787 | A1 * | 6/2019 | Besanson Tuma | G06Q 40/02 |
| 2020/0027089 | A1 * | 1/2020 | Kuchar | G06Q 20/4016 |
| 2020/0349564 | A1 * | 11/2020 | Padmanabhan | G06F 16/1834 |
| 2021/0039669 | A1 * | 2/2021 | Watson | G08G 1/09623 |
| 2021/0149365 | A1 * | 5/2021 | Irwin | G05B 19/406 |
| 2022/0043434 | A1 * | 2/2022 | Bischoff | H04L 9/0819 |
| 2022/0198446 | A1 * | 6/2022 | Potanin | G06Q 20/389 |

FOREIGN PATENT DOCUMENTS

WO WO-2018224431 A1 * 12/2018
WO WO-2019119541 A1 * 6/2019

* cited by examiner

*Primary Examiner* — Evral E Bodden
(74) *Attorney, Agent, or Firm* — Alleman Hall Creasman & Tuttle LLP

(57) ABSTRACT

A computer device comprises a logic system and a computer-memory system operatively coupled to the logic system. The computer-memory system holds instructions that, when executed by the logic system, cause the computer device to instantiate a node of a blockchain having verifiable provenance. The blockchain includes a requestor block configured to specify at least one requested feature of a requested product and an offerer block cryptographically linked to the requestor block. The offerer block includes data obtained by automated testing of an offered product, which reveals the level of compliance of the offered product with respect to the requested feature through product feature life cycle of validation, test, verification and acceptance.

23 Claims, 10 Drawing Sheets

PRODUCT PROCUREMENT WITH AUTOMATED QUALIFICATION

TECHNICAL FIELD

This disclosure relates generally to procurement, and more specifically to automated, cryptographically verifiable qualification of a manufactured product, including equipment, tools, and/or software.

BACKGROUND

Text and drawings can be used to define the features of a product requested from one or more potential suppliers of the product. The same text and drawings can be a basis for the suppliers' design of the product and, during inspection and qualification of the product, for determining whether and to what degree the product meets predetermined requirements. However, human inspection of manufactured products and human interpretation of text and drawings can be slow, disputable, inconsistent, and subject to bias.

SUMMARY

In view of the above issues, one aspect of this disclosure relates to a computer device comprising a logic system and a computer-memory system operatively coupled to the logic system. The computer-memory system holds instructions that, when executed by the logic system, cause the computer device to instantiate a node of a blockchain having verifiable provenance. The blockchain includes a requestor block configured to specify at least one requested feature of a requested product and an offerer block cryptographically linked to the requestor block. The offerer block includes offerer data obtained by automated testing of an offered product, which reveals the level of compliance of the offered product with respect to the requested feature.

Another aspect of this disclosure is directed to a computer-implemented method in which requestor data that specifies a requested feature of a requested product is provided via a network. The requested feature is specified in terms of a result of an automated test procedure and includes an acceptable tolerance range. Access to the network is extended to at least one offerer of the requested product, the access including a time-stamped, user-authenticated write permission. Then, offerer data that reveals a level of compliance of an offered product with respect to the requested feature is received via the network. The offerer data is obtained pursuant to executing the automated test procedure on the offered product.

Another aspect of this disclosure is directed to a computer-implemented method in which a requestor block extending initial access permission to offerers of a requested product is published on a blockchain. The blockchain is accessed in order to receive a plurality of offerer blocks cryptographically linked to the requestor block, each of the plurality of offerer blocks being published by an offerer of the requested product. Continued access permission to the blockchain is then provided to an approved subset of the offerers of the requested product. The blockchain is accessed in order to receive a subsequent offerer block from at least one of the approved subset of offerers of the requested product, the subsequent offerer block including offerer data obtained by automated testing of the offered product. The offerer data reveals a level of compliance of an offered product with respect to at least one requested feature of the requested product.

Yet another aspect of this disclosure is directed to a computer-implemented method in which an offerer computer device joins a network that supports a blockchain having a requestor block. The requestor block includes requestor data that specifies at least one requested feature of the requested product. The offerer computer device accesses the requestor block to receive the requestor data and adds to the blockchain at least one offerer block cryptographically linked to the requestor block. The at least one offerer block includes offerer data, obtained by automated testing of the offered product, that reveals a level of compliance of an offered product with respect to the at least one requested feature.

The Summary above is provided to introduce a portion of this disclosure in simplified form, not to identify key or essential features. The claims appended to this disclosure define the claimed subject matter, which is limited neither to the content of the Summary nor to implementations that address any problems or disadvantages noted in this disclosure. The features, functions, and advantages described in this disclosure may be achieved independently in some embodiments and may be combined in other embodiments.

BRIEF DESCRIPTION OF THE DRAWINGS

The disclosure herein will be better understood from reading the following Detailed Description with reference to the attached drawing figures, wherein.

DETAILED DESCRIPTION

Figure 1:
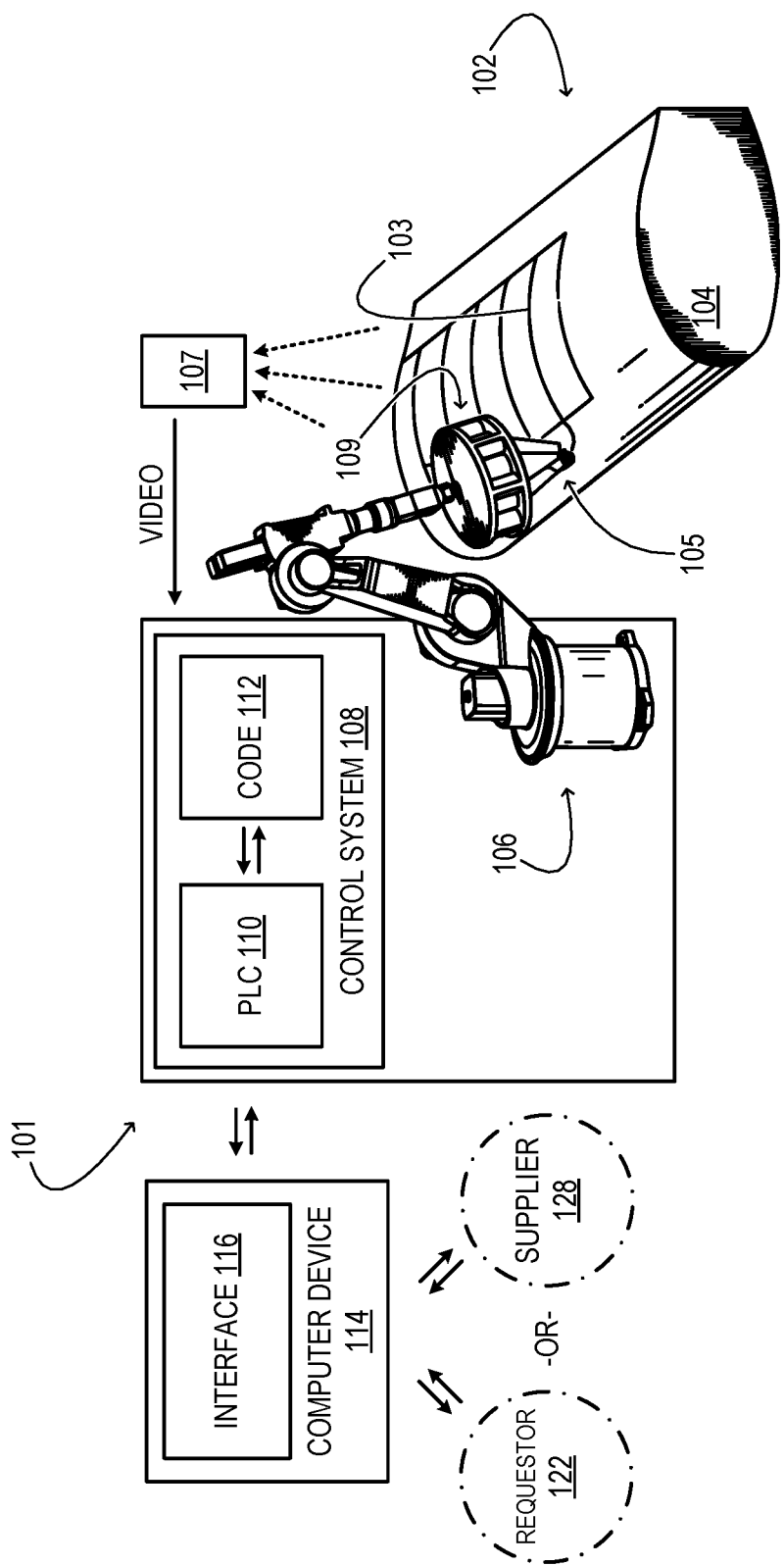
FIG. 1 is a schematic representation of an example manufactured product.

In industrial commerce, one party may contract with another for procurement of a manufactured product. The contract between the parties may specify various aspects of the product in considerable detail. The contract may define the required quantity, structure and/or function of the product, the amount that the requesting party is willing to pay for the product, and a timeline for delivery and payment, for example. The required structure and function of the requested product may be defined in a specification portion of the contract. The specification portion may include engineering drawings with required dimensions and engineering tolerances, process-flow diagrams with process tolerances, and so forth. In state-of-the-art industrial commerce, the determination of whether and to what degree a delivered product matches the required features of a requested product is made by skilled workers, who carefully compare the features of the delivered product against the required features set forth in the specification. This process is referred to as 'qualification' of the product. As noted in the Background section above, qualification of a complex product by traditional inspection and approval may be time-consuming, laborious, and expensive. Moreover, because the qualification process relies on human inspection and human judgment, the results may be subject to human error and human bias.

By contrast, a current trend in systems engineering is to reduce human involvement in the performance testing of engineered products. In model-based systems engineering (MBSE), an engineered product may be associated with one or more product-analogous digital models that define the product structurally and/or functionally. Such models provide an efficient way to examine a wide range of features and behaviors of the product, but without reliance on traditional documentation or human interpretation thereof. In practice, engineers may use the product-analogous models to refine the design of the actual product and to evaluate product performance, often with high fidelity. Nevertheless, qualification via MBSE may not be suitable for all products and product features, because it may be difficult to guarantee that the features of the model being interrogated correspond exactly to the features of the realized product.

Accordingly, the examples herein describe computer componentry and associated methodology to facilitate automated qualification of a requested product and other aspects of procurement of the product. In one example, the requestor of the product provides requestor data that specifies one or more requested features of the product. The requested features may include quantity and cost estimation, in addition to various technical and/or functional features. Any, some, or all of the requested features may be defined in terms of results of an automated test procedure to be conducted on the product. Subsequently, the requestor receives offerer data from an offerer of the product. Obtained pursuant to executing the automated test procedure on the offered product and/or by automated testing features executed by the product itself, the offerer data validates one or more offerer contributions toward procurement of the product. In other words, the offerer data reveals a level of compliance of the offered product with respect to the one or more requested features. In some examples, the data exchanged between the requestor and offerer of the product are arranged within a sequence of blocks of a blockchain. The blockchain approach provides transparency and auditability of the exchanged data. In this manner, reliance on human inspection of the product, as well as human interpretation of documents and subjective human assessment of product features, is reduced.

This disclosure will now be presented by way of example and with reference to the drawing figures listed above. Components, process steps, and other elements that may be substantially the same in one or more of the figures are identified coordinately and are described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see.

FIG. 1 is a schematic representation of a manufactured product 101 that may be exchanged from one party to another according to a procurement contract. In the non-limiting example of FIG. 1, product 101 takes the form of a manufacturing asset, which is used in the assembly of a complex article in the form of aircraft section 102. In FIG. 1, the illustrated product is a robotic fiber-alignment asset used to align a series of high-strength carbon fibers 103 arranged between the ribs 104 of an aircraft wing. To that end, the manufacturing asset includes a fiber manipulator 105, which is coupled to an actuator arm 106. Actuator arm 106 may include a plurality of independent servo-mechanical actuators (not shown) that drive actuator arm 106 translationally (e.g., in the X, Y, and/or Z directions) and/or rotationally (e.g., about any, some, or all of the X, Y, and Z axes). In the configuration shown in FIG. 1, fibers 103 are drawn from spool 109, which is integrated into actuator arm 106.

Product 101 also includes a video camera 107 coupled to actuator arm 106. Video camera 107 is configured to image the portion of aircraft section 102 that is being operated on by fiber manipulator 105. Video feed from video camera 107 is provided to control system 108 of product 101. Control system 108 may include image-processing componentry (e.g., processors, computer memory, etc.) that enable metrological examination of aircraft section 102 or any other article during the process of manufacture. Control system 108 of product 101 also includes a programmable logic controller (PLC) 110 that controls the positioning of actuator arm 106 and the operation of fiber manipulator 105. To that end, PLC 110 receives instructions from code segment 112, which may include PLC script (not shown). The PLC script may include absolute and/or relative actuator-arm movement instructions, fiber-release instructions, and so forth. In addition, the PLC may furnish output data in the form of an error signal that varies as the difference between the instantaneous actuator-arm position and the corresponding control set point as a function of time.

Control system 108 of product 101 is communicatively coupled to computer device 114, which may be operated by requestor 122 or by supplier 128 of product 101. To this end, computer device 114 may include suitable interface componentry 116. Interface componentry 116 may be configured to exchange virtually any kind of data relevant to the qualification of product 101. Such data may include image data from video camera 107, PLC script, PLC output, and the like.

Figure 2:
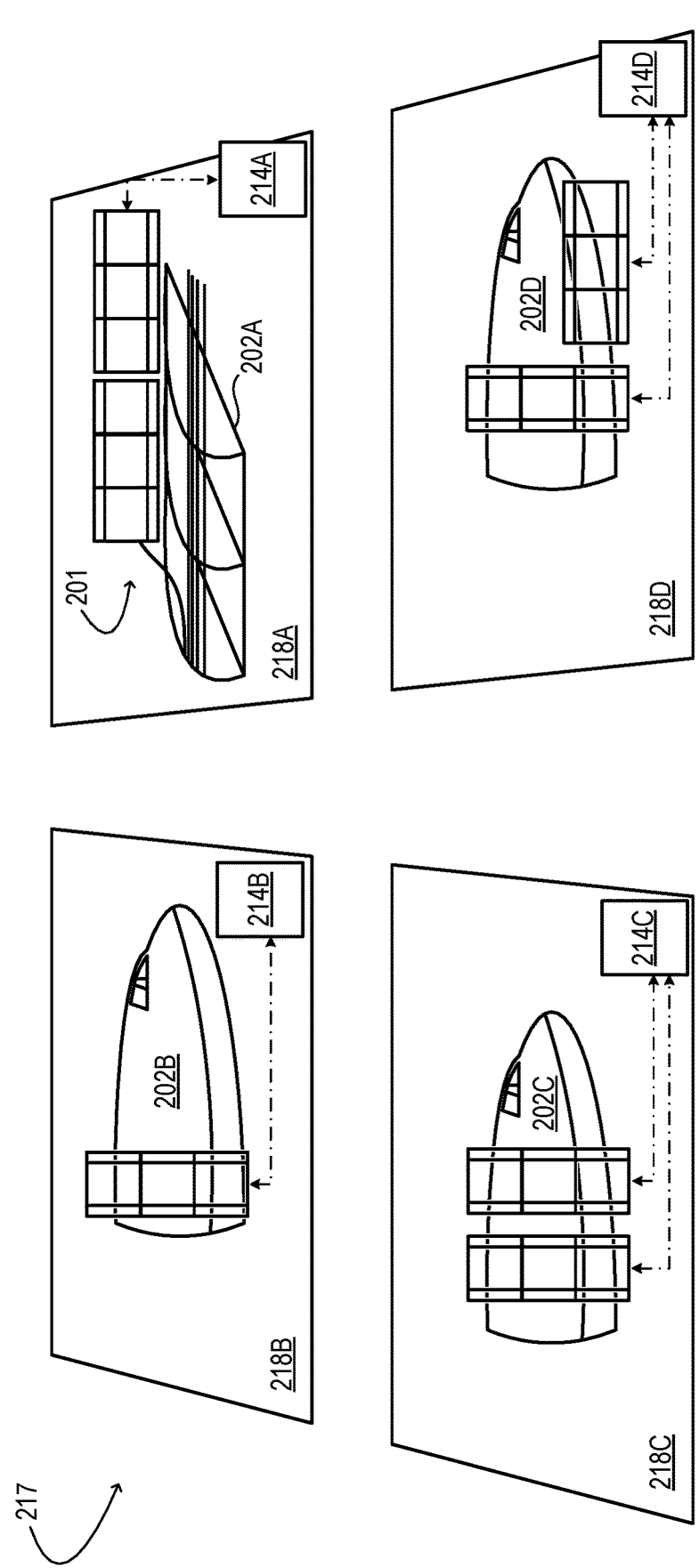
FIG. 2 shows aspects of a manufacturing environment in which a manufactured product may be used in accordance with an example.

FIG. 2 shows aspects of an example manufacturing environment 217 in which a product 201 in the form of a manufacturing asset may be used. Manufacturing environment 217 of FIG. 2 is the interior of an aircraft factory, were plural sections 202 of an aircraft are manufactured concurrently. The manufacturing environment is divided into a plurality of manufacturing cells 218 supporting manufacturing operations on different aircraft sections 202. Each cell includes a cell controller 214. Each cell controller 214 is a networked computer system or terminal of a computer system. Taken together, the plurality of cell controllers is configured to coordinate manufacturing activity in manufacturing environment 217. To this end, each cell controller 214 may include interface componentry 116 described above for computer device 114 of FIG. 1. Such interface componentry may enable each cell controller 214 to exchange data with any suitably configured tool, manufacturing asset, or diagnostic equipment arranged in the same manufacturing cell 218. Cell controller 214 may also include network interface componentry that enables communication and coordinated control activity among the plurality of cell controllers 214 of environment 217.

Referring again to FIG. 1, it will be noted that product 101 is one of a virtually limitless range of products that may be procured and qualified according to automated methods described herein. Numerous alternative products are also envisaged, as are alternative qualification environments. In some alternatives, for instance, video camera 107 may be a remote video camera which is not part of product 101, but is communicatively coupled to computer device 114 (e.g., cell controller 214) to enable image-based qualification of product 101. In some embodiments, various other sensors may provide other qualification data for product 101. In some examples, the product may be a relatively simple asset, such as a powder coater. In some examples, the product may be a commodity product, such as a machine screw. In general, the automated qualification described herein can be used to qualify virtually any manufactured product using appropriate computer-operable testing methodologies.

Figures 3A, 3B:
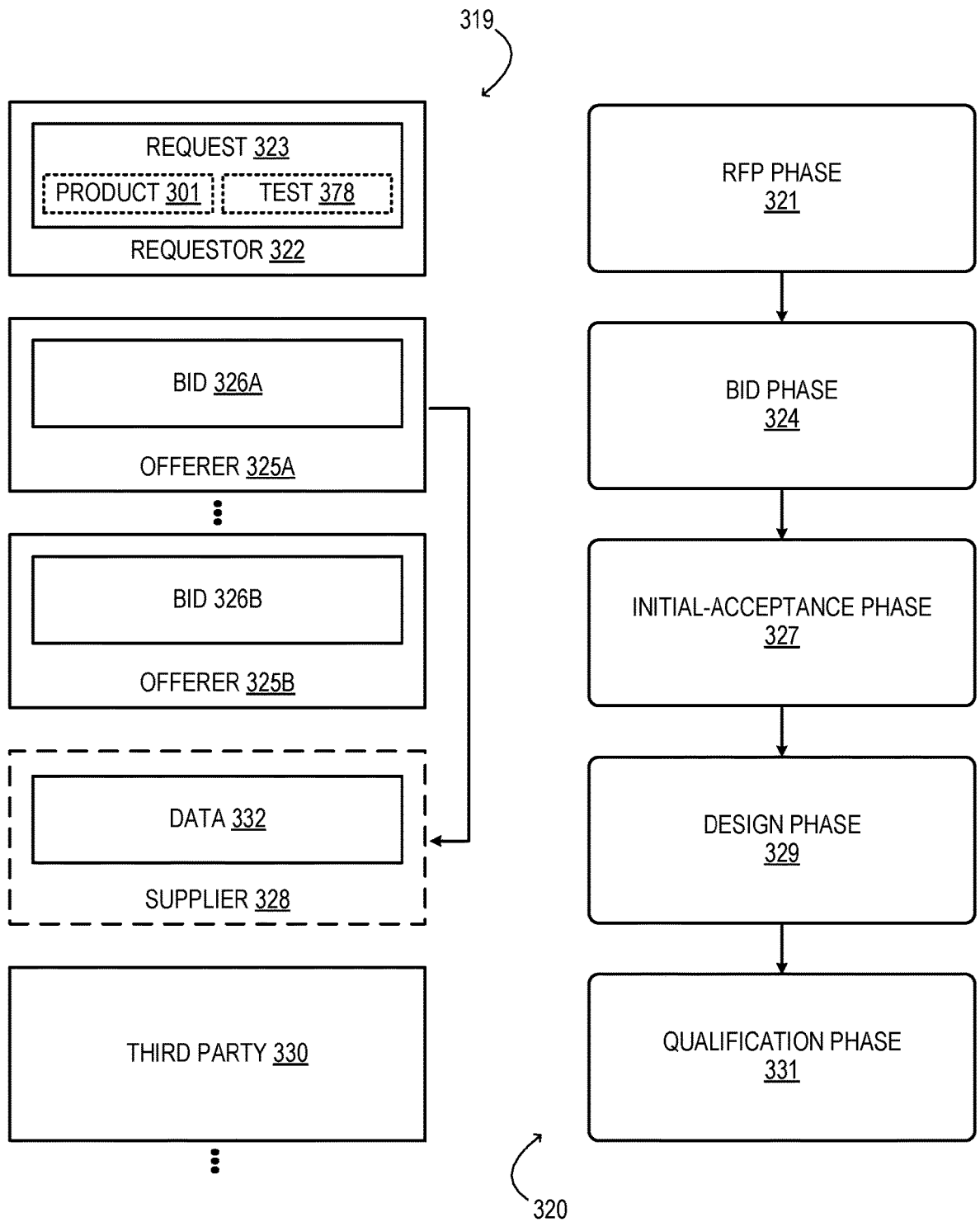
FIG. 3A represents various parties that may be involved in automated qualification of a manufactured product in accordance with an example.
FIG. 3B illustrates a simplified process flow that may occur during automated qualification of a manufactured product in accordance with an example.

Turning now to FIGS. 3A and 3B, this disclosure is directed to computer methodology to facilitate automated qualification of a requested product 301 and other aspects of procurement of product 301. The term 'requested product' refers herein to a not-yet-manufactured product, which is specified by a requestor 322 according to the needs of the requestor 322. By contrast, the term 'offered product' refers to an actual product as offered by an offerer 325 according to requestor specifications. Non-limiting examples of offered products include offered products 101 and 201 in the foregoing drawings and description. FIG. 3A schematically represents various parties 319 that may be involved in a contract for procurement of product 301. FIG. 3B illustrates a simplified example process flow 320 that may occur during execution of such a contract.

The first phase of process flow 320 is a request-for-proposal (RFP) phase 321 initiated by a requestor 322 of requested product 301. In the RFP phase, the requestor specifies one or more aspects of requested product 301 in preliminary detail. Such aspects may include the required quantity, structure, and/or function of requested product 301, a suggested or maximum price for requested product 301 and a timeline for delivery and payment, for example. These aspects may be included in product request 323. In the example illustrated in FIG. 3A, product request 323 includes a detailed specification of requested product 301. The detailed specification of requested product 301 may be associated with an automated test procedure 378 to be conducted on one or more products (e.g., products 101, 201 in the drawings above) offered to requestor 322, in order to qualify such products. Automated test procedure 378 will be further described hereinafter.

The next phase of process flow 320 is a bid phase 324, in which various offerers 325 indicate interest in supplying requested product 301 to requestor 322 according to product request 323. To that end, each offerer 325 may provide a bid 326 that specifies one or more aspects of an offered product 101, 201 in preliminary detail. Such aspects may include the offered quantity, structure, and/or function of the product, the amount that the offerer is willing to accept for the product, and a timeline for delivery and payment, for example.

The next phase of process flow 320 is an initial acceptance phase 327, in which requestor 322, having reviewed bids 326 of the various offerers 325, selects one or more of the offerers 325 as suppliers of requested product 301. For ease of description, the remainder of process flow 320 is illustrated according to a scenario in which only one offerer 325 is selected as a supplier 328 of requested product 301. That aspect is by no means necessary, however, as the approach herein is equally compatible with selection of two or more suppliers 328.

The next phase of process flow 320 is a design phase 329, in which one or more specific features of requested product 301, or of the process by which requested product 301 is made or delivered, are further defined. In some examples, such features are arrived at cooperatively by requestor 322, supplier 328, and/or one or more third parties 330. Example third parties may include requestor partners, supplier affiliates, government regulators, etc. In some examples, the features specified during design phase 329 may relate to industrial and/or occupational safety. In some examples, the features specified during the design phase may reflect constraints related to the involvement of the one or more of the third parties. In some examples, the features specified during the design phase may enable requestor 322 to exert a level of supervision or control over the design of requested product 301. For instance, requestor 322 may require a sequence or timeline for completion of specified components or subunits of requested product 301. Such a requirement may enable requestor 322 to track the progress of manufacture of requested product 301, and, should the progress be delayed, to make adjustments in the scheduling of activities coordinated to delivery of requested product 301.

The final phase of process flow 320 is qualification phase 331, in which requestor 322 assesses the suitability of an offered product 101 as supplied by supplier 328. In some scenarios, the qualification phase may commence with the delivery of offered product 101 to requestor 322. In other scenarios, at least some product qualification may be conducted before offered product 101 is delivered to requestor 322. In some examples, product qualification may include evaluating whether offered product 101 meets acceptable tolerances, which may include process and/or engineering tolerances. In some examples, product qualification may include authenticating the software or verifying the version of the software installed on offered product 101.

In the present example one or more of RFP phase 321, bid phase 324, initial acceptance phase 327, design phase 329, and qualification phase 331 are conducted autonomously or semi-autonomously via a system of computer devices. To that end, supplier 328 may provide, during the design and/or qualification phases, compliance data 332 that enables requestor 322 to determine whether and to what degree the supplier has fulfilled the terms of product request 323.

Figure 4:
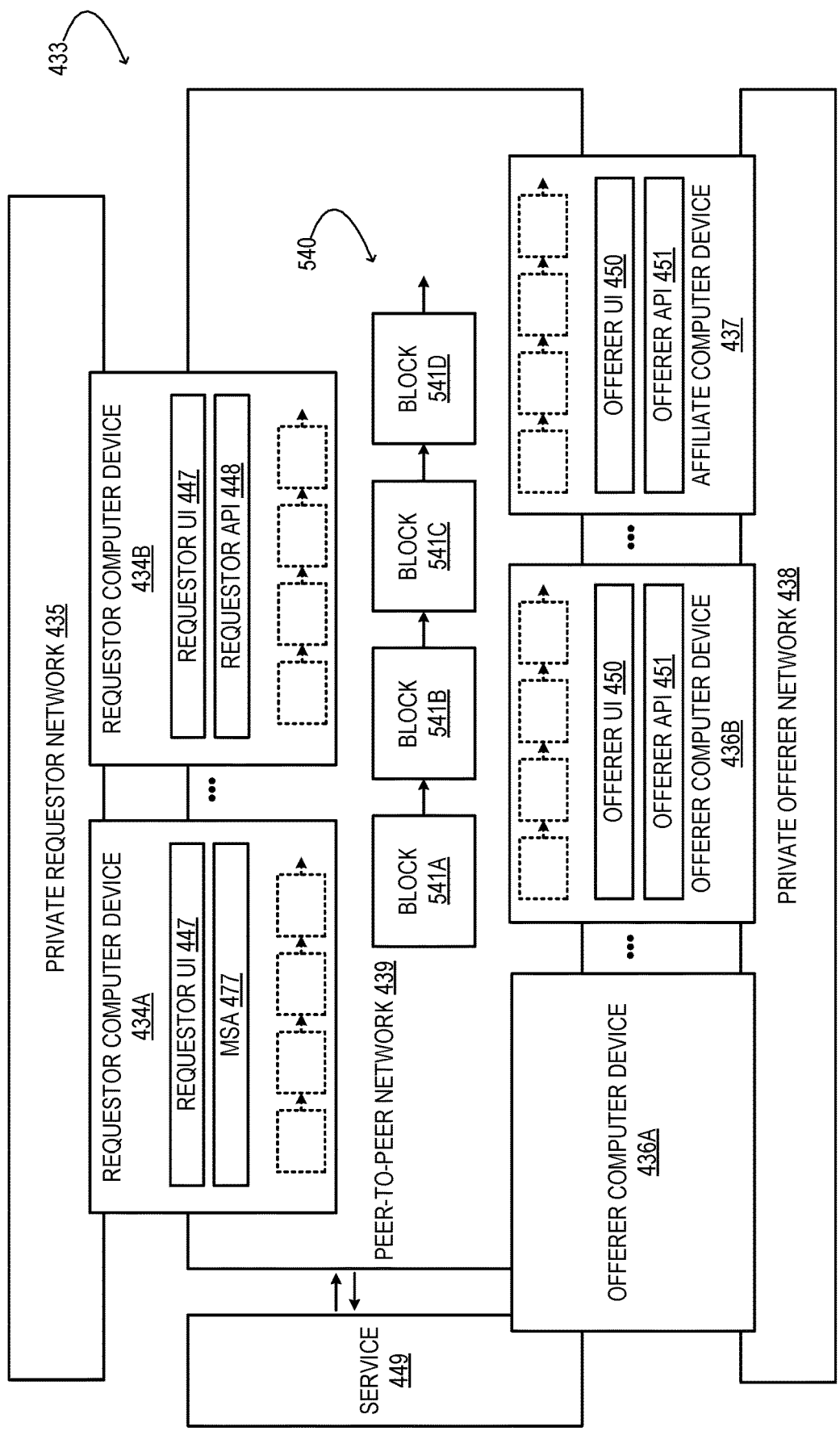
FIG. 4 shows aspects of a procurement system configured to facilitate automated qualification of a manufactured product in accordance with an example.

FIG. 4 shows aspects of an example procurement system 433 configured to facilitate automated qualification of requested product 301 (as shown in FIG. 3) and other aspects of procurement of requested product 301. Procurement system 433 includes one or more requestor computer devices 434. The requestor computer devices 434 may be linked by a network 435 such as a private local-area network (LAN), a virtual private network (VPN), or a public network such as the Internet. Procurement system 433 also includes one or more offerer computer devices 436 and may further include one or more affiliate computer devices 437 operated by one or more affiliates of an offerer 325—e.g., an engineering firm or subcontractor engaged in making or testing the offered product 101. The offerer and affiliate computer devices 436 and 437, respectively, may be linked via a private offerer network 438, such as a LAN or VPN. In some implementations, any, some, or all of the requestor and offerer computer devices may also be linked via a wide-area network (WAN), such as the Internet. In some implementations, the requestor, offerer, and/or affiliate computer devices of FIG. 4 may be instances of computer device 114 of FIG. 1 (or cell controller 214 of FIG. 2) and may include the hardware interface indicated for that computer device. Continuing in FIG. 4, requestor and offerer computer devices 434 and 436 of procurement system 433 are further linked by an additional network. In the illustrated example, this additional network takes the form of a peer-to-peer network 439.

Figure 5:
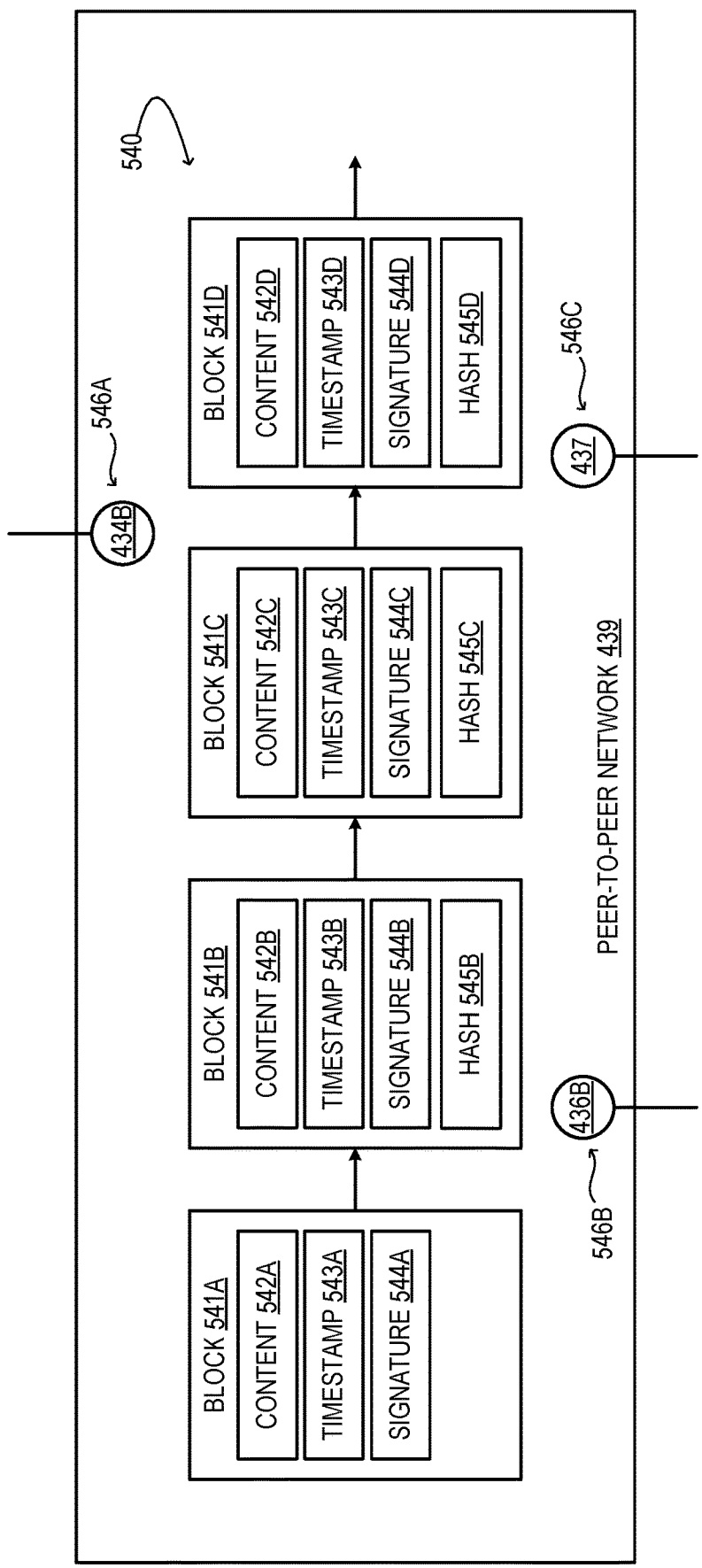
FIG. 5 shows aspects of a blockchain on a peer-to-peer network in accordance with an example.

FIG. 5 shows aspects of an example peer-to-peer network 439 in greater detail. Peer-to-peer network 439 supports blockchain 540. In particular, blockchain data in the form of blocks 541 may be transmitted via peer-to-peer network 439. Accordingly, FIG. 5 shows blockchain 540 residing on the peer-to-peer network. As any peer-to-peer network comprises the combined computer-memory systems of its various nodes, blocks 541 may be stored redundantly on any, some, or all of the nodes 546 of peer-to-peer network 439. Such nodes may comprise requestor, offerer, and/or affiliate computer devices 434, 436, and 437, respectively, as shown in FIG. 4. Accordingly, nodes 546 of peer-to-peer network 439, on which blocks 541 are stored, also may be referred to as nodes of blockchain 540.

As noted above, blockchain 540 of FIG. 5 includes a plurality of blocks 541 of digital data. Each block includes content data 542, a timestamp 543, and a cryptographic digital signature 544. Digital signature 544 provides source-authentication of the content data 542. Digital signature 544 may comprise an encrypted name, number, or other identifier of the requestor 322 or offerer 325 of a product 101, for example. In the present context, content data 542 of FIG. 5 may comprise data provided by requestor 322 (e.g., request 323 in FIG. 3A) in addition to data contributed by any offerer 325 of the product (e.g., bid 326 and/or compliance data 332). Timestamp 543 may be supplied by a distributed service executing on peer-to-peer network 439, in encrypted form, to provide immutability. Each block 541 also includes, with the exception of genesis block 541A, a cryptographic hash 545 of the content data 542 of a previously written, antecedent block 541. Hash 545 cryptographically links each block 541 to its antecedent, defining the blockchain structure. Any, some, or all of the blocks 541 of blockchain 540 may be shared among the requestor and offerer computer devices 434 and 436, among others optionally, that are linked by peer-to-peer network 439.

Any computer device registered as a node 546 of blockchain 540 may be configured to examine blockchain 540 in order to verify the provenance of any given block 541—viz., by comparing hash 545 of the given block against an independently computed hash of the previous (e.g., antecedent) block 541. The verification may be iterated all the way back to genesis block 541A if desired. This feature makes content data 542 of blockchain 540 effectively immutable, in the sense that it cannot be altered without the approval of a consensus of nodes 546. Blockchain 540 may be characterized as 'public' or 'private'. When configured as a public blockchain, blocks 541 can be accessed and/or added by any computer device capable of joining peer-to-peer network 439. When configured as a private or 'permissioned' blockchain, the permissions extended to each node 546 are determined by a central authority—e.g., requestor 322 of FIG. 3A. The blockchain 540 may be further characterized as 'centralized' or 'decentralized'. A centralized blockchain may reside on a network maintained by the authority, whereas the network hosting a decentralized blockchain is typically a peer-to-peer network.

Returning now to FIG. 4, at least one requestor computer device 434 of procurement system 433 is configured to deploy blockchain 540 on peer-to-peer network 439, to facilitate automated qualification of a requested product 301 and other aspects of procurement of the product. A requestor computer device 434 may be further configured to instantiate itself or another requestor computer device 434 as a requestor node of the blockchain 540. More specifically, the requestor computer device 434 accesses peer-to-peer network 439 and registers itself or another requestor computer device 434 as a node 546 of peer-to-peer network 439 with access to blockchain 540. To that end, software installed on the requestor computer device 434 may execute a requestor user interface (UI) 447 that exposes methods and properties of a requestor application-programming interface (API) 448. The user interface 447 can be used to set node permissions, build new blocks 541, or record input into blocks 541. Requestor API 448 provides a template for the creation of new blocks 541 and an interface to exchange local data with blockchain 540, including test procedure-data and test output data. Requestor API 448 is configured to interact with a blockchain-deployment service 449, such as Ethereum, using an industry standard protocol, such as Interledger Protocol (ILP). In these and other examples, UI 447 may expose methods and properties of a microsystem architecture 477, which offers one or more relatively de-coupled services to a requestor computer device 434, in lieu of the integrated interface services of API 448.

At least one offerer computer device 436 of procurement system 433 is configured, via appropriate software, to instantiate itself as an offerer node of blockchain 540. Such software may include an offerer user interface 450 that exposes methods and properties of an offerer API 451. The offerer API 451 is configured to support various interactions with blockchain 540, which include block access and block addition. In particular, offerer API 451 may facilitate the upload of automated test data to blockchain 540.

Figure 6:
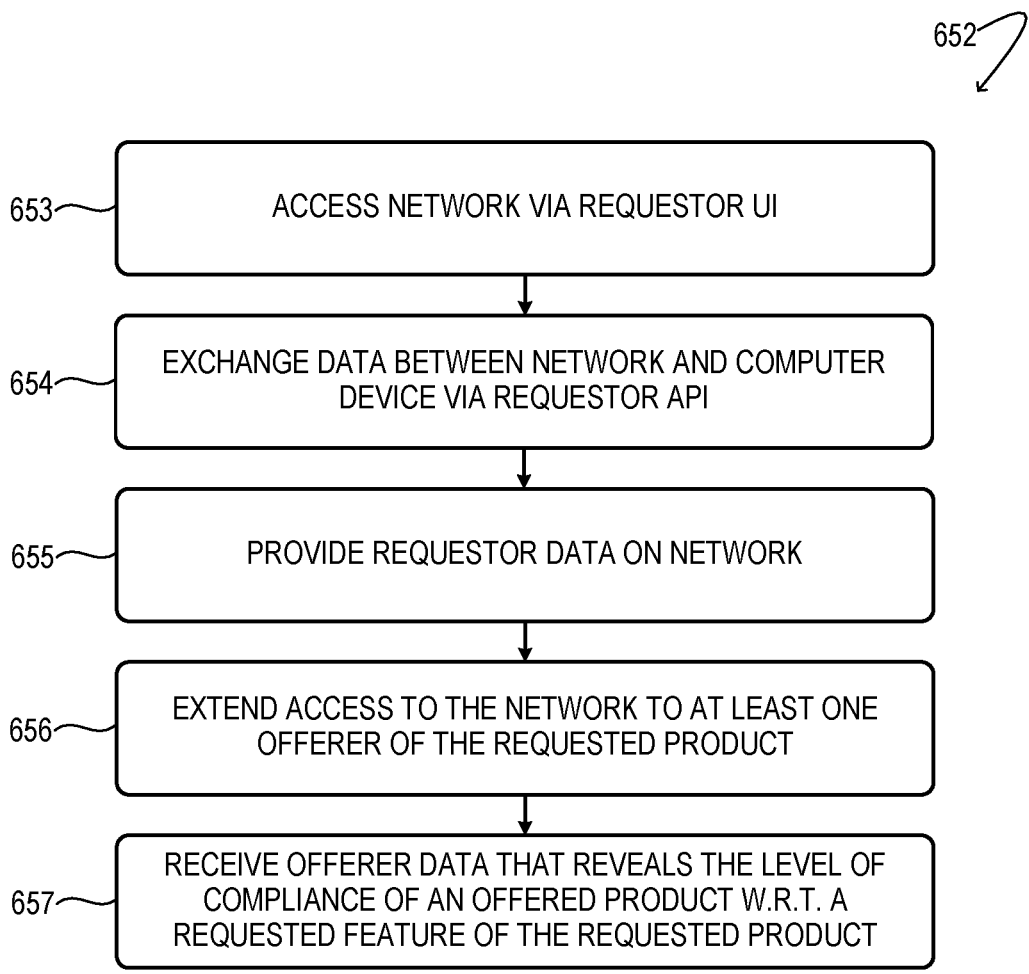
FIG. 6 illustrates aspects of a computer-implemented method to facilitate automated qualification of a manufactured product in accordance with an example.

FIG. 6 illustrates aspects of a computer-implemented method 652 to facilitate automated qualification of a requested product and other aspects of procurement of the product. For clarity of description, some aspects of the method are illustrated with reference to an example scenario in which the product is a robotic manufacturing asset as shown in FIG. 1, and the requestor of the product is a manufacturer. This example scenario should not be construed to limit the applicability of method 652.

At 653 of method 652, a requestor accesses a network via a requestor UI executing on a requestor computer device. The network accessed by the requestor may also be accessible to one or more potential offerers of a requested product. In some examples, the network may comprise a peer-to-peer network supporting a blockchain. The requestor UI may be configured to control access permissions of one or more nodes of the network to data residing thereon (e.g., within the blocks of a blockchain). For instance, access permissions may be restricted to nodes with an approved cryptographic key that may be authenticated, as one access condition. In some examples, the requestor UI may be configured to facilitate addition of data to the network (e.g., addition of one or more new blocks to a blockchain). In some examples, the requestor UI may be configured to facilitate entry of data to the network (e.g., via manual or automatic upload of data to one or more blocks of a blockchain).

At 654 data is exchanged between the network and the requestor computer device via a requestor API. In some examples, the requestor API may include a representational state-transfer (REST) API. In some examples, a Microservice Architecture (MSA) may be used. In some examples, a REST API and/or MSA may employ a cloud based or streaming technology to capture and identify attributes of interest from the requester network as source data for a container or virtual machine (VM) technology. The container or VM technology may be configured to manage the content served via an industry standard protocol, such as ILP. In this manner, a new block may be created for validation and/or verification.

In some examples, the data may be exchanged pursuant to the requestor's network access via the requestor UI. In some examples, the services noted above may be configured to manage the data (e.g., specifications) exchanged between the requester and the offer of the requested product. Whenever a transaction is authenticated, requesters and offerers may be required to validate that a new block is attached to the blockchain. Because the blockchain is immutable, the API or MSA may be configured to add the new block accurately, as subsequent changes to the block may not be possible. Thus, the configuration of a specification and its solution maintains the provenance of the contract.

At 655 requestor data is provided on the network to specify a requested feature of the requested product. The requested feature may be specified in terms of a result of an automated test procedure to be conducted on the requested product. In the example in which the requested product is a robotic manufacturing asset capable of aligning fibers, the requestor may require that the asset can align ten-meter lengths of fibers in parallel, with an inter-fiber spacing of five millimeters, for example. In order to establish whether the robotic manufacturing asset can achieve this, the requestor may supply a programmed test procedure including PLC script that commands the asset to execute a prescribed fiber alignment and to return data that reveals the actual positions of the aligned fibers. In some examples, the requested feature may include an acceptable tolerance range to be applied to a specified result. For instance, the acceptable tolerance range for the five-millimeter inter-fiber spacing may be ±1 millimeter (or more, or less, depending on the implementation). In this example, the acceptable tolerance range includes an engineering-tolerance range. In other examples, the acceptable tolerance range may include a process-tolerance range. For instance, the desired fiber-alignment bandwidth of the robotic manufacturing asset may be specified at 10±2 meters of fiber per hour or may be specified in pounds per hour, etc., again depending on the implementation. The requestor data may be uploaded to the network in any suitable manner; in blockchain implementations, the requestor data may be encoded in a requestor block of the blockchain. Pursuant to the manufacturers' requirements, the suppliers offering computers may also be relegated to provide designed in-fault data that would potentially cover any anomalies, disruptions or faults generated by the sensors on machine assets or supplied products.

At 656 access to the network that hosts the requestor data is extended to at least one offerer of the requested product. Such access may include a time-stamped, user-authenticated write permission. In some examples, the write permission may be restricted to offerer computer devices having an approved cryptographic key that can be authenticated. The network access extended to the offerer enables the offerer to upload offerer data that the requestor may examine in order to assess the level of compliance of an offered product with respect to one or more requested features of the requested product.

The offerer data may be obtained pursuant to executing the above automated test procedure on the offered product. Generally speaking, the 'level of compliance' is a figure of merit that varies according to the degree to which a given feature of the offered product matches a corresponding feature of the requested product. In one example, the level of compliance may be binary-valued, indicating whether the offered product does or does not match the requested feature. Offerer data submitted in response to a cost-control aspect of the request may reveal a binary-valued level of compliance. In other words, the offerer's bid either is or is not within the requestor's acceptable cost range.

In other examples, the level of compliance may admit of three or more discrete values or a continuous range of values. In an MBSE implementation, for instance, the requestor data may specify a testing algorithm to be executed on a properly constructed, digital model of the product. In a particular example in which the product is an aircraft aileron, the requestor may require that a digital model of the aileron is subjected to a stress test simulating sheer forces that may be encountered during flight. Accordingly, the offerer data may comprise a result of the stress test as applied to an offered aileron. In this example, the level of compliance may be assessed separately for each of an ascending series of stress-input values.

In other examples, the requestor data may specify a test procedure to be executed on the product itself. In a particular example in which the product is a robotic fiber-alignment asset, the requestor may specify a suitably challenging fiber-alignment test procedure. In this example, the offerer data may include servo-mechanical error data from an actuator arm of the robotic fiber-alignment asset. The servo-mechanical error data may be collected during execution of the test procedure specified by the requestor data and may reflect the level of compliance to the fiber-alignment program specified in the requestor data.

At 657, accordingly, the requestor computer device receives such offerer data via the network. By automatically comparing the offerer data against the desired result of the test procedure, the requestor computer device may determine the precision and/or rate of fiber alignment by the offered product. These figures of merit may be compared to the specified engineering and process tolerances in order to determine whether the offerer product has performed satisfactorily. In other examples, offerer image data acquired by a video camera in the product—or in the environment in which the product is tested—may be processed and used to assess the degree to which the product meets the requirements specified by the requestor. In other examples, other types of sensor data may be used. In the fiber-alignment example, for instance, image and/or other sensor data, together with appropriate metrological analysis, may be used to verify the final positions of the aligned fibers in a test article. In examples in which the network comprises a peer-to-peer network that supports a blockchain, the offerer data may be encoded in an offer block of the blockchain, which is cryptographically linked to the requestor block. In some blockchain implementations, a requestor block arranged downstream of the offerer block may be programmed to receive offerer data from the offerer block and, optionally, to enact a comparison against requestor data encoded in a requestor block arranged upstream of the offerer block.

In some examples, the requestor data may specify two or more automated test procedures to be conducted on the product. When two or more automated test procedures are specified, the requestor data may, in some instances, further specify the sequence in which the two or more automated test procedures are to be conducted. In this manner, the requestor data may set forth a series of qualification stages, or milestones, desirable for the orderly qualification of a complex product. By examination of offerer data related to each milestone and uploaded to the network, a requestor computer device may be apprised of the offer's progress toward completion of the milestones. The requestor UI may be configured to display the state of completion of each milestone on a dashboard, in one example. In some implementations, one or more automated qualification stages and one or more non-automated qualification stages (requiring human inspection and verification) may be included in a given series. Verification by a human being may be incorporated in the requestor data structure in any suitable manner—e.g., as a dedicated requestor block of a blockchain, which is uploaded manually by the requestor using a requestor UI.

Figure 7:
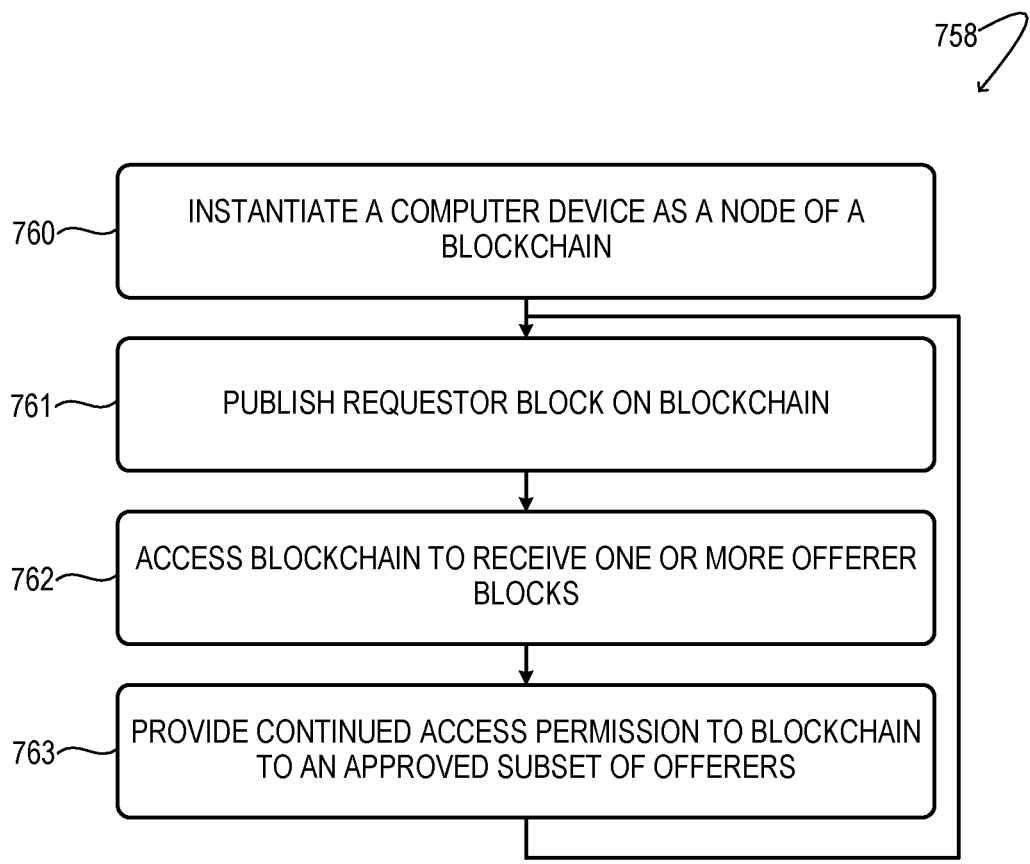
FIG. 7 illustrates aspects of another computer-implemented method to facilitate automated qualification of a manufactured product in accordance with an example.

FIG. 7 illustrates aspects of another computer-implemented method 758 to facilitate execution of a contract for procurement of a requested product. Again, reference to example scenarios and implementation details should not be construed to limit the applicability of the method.

At 760 of method 758, a requestor computer device is instantiated as a node of a blockchain that extends initial access permission to potential offerers of a requested product. At 761 the requestor computer device publishes a requestor block on the blockchain. The requestor block is configured to specify at least one requested feature of the requested product. The requestor block may specify the product requirements as known during an RFP phase of the product-procurement process. In some examples, the initially published requestor block may include an RFP or bid request.

At 762 the requestor computer device accesses the blockchain in order to receive a plurality of offerer blocks each cryptographically linked to the requestor block. Each of the plurality of offerer blocks received is published by an offerer of the requested product. In some examples, the plurality of offerer blocks may include one or more bid specifications. Parallel access to the blockchain during the RFP and bid phases ensures that competing offerers have equal access to the most up-to-date product specification. This aspect provides transparency and fair dealing throughout the RFP phase, which may help to ensure compliance with applicable regulations, laws, and/or standards. In some implementations, offerers may be granted read access to each other's bid specifications, which provides additional transparency. Nevertheless, in some implementations, parallel access may be restricted to certain parties (e.g., parties with appropriate security clearance, in which case the restriction may be optionally enforced via a cryptographic key).

At 763 continued access permission to the blockchain is provided to an approved subset of the offerers of the requested product. This feature protects the confidentiality of subsequent data exchange between the requestor and the approved subset of offerers. In some examples, providing the continued access permission includes pruning the blockchain onto an access-restricted blockchain. In some examples, providing the continued access permission includes restricting the continued access permission to the original blockchain from offerers not within the approved subset of the offerers of the requested product. In still other examples, continued access may be provided to particular restricted portions of the original blockchain, or of a blockchain derived from the original blockchain.

Execution of method 758 now returns to 761, where the requestor computer device may publish, exclusively to the approved subset of offerers, additional requestor blocks that specify additional product requirements. Subsequent requestor access of the blockchain at 762 now retrieves additional offerer blocks provided exclusively by the approved subset of offerers.

Figure 8:
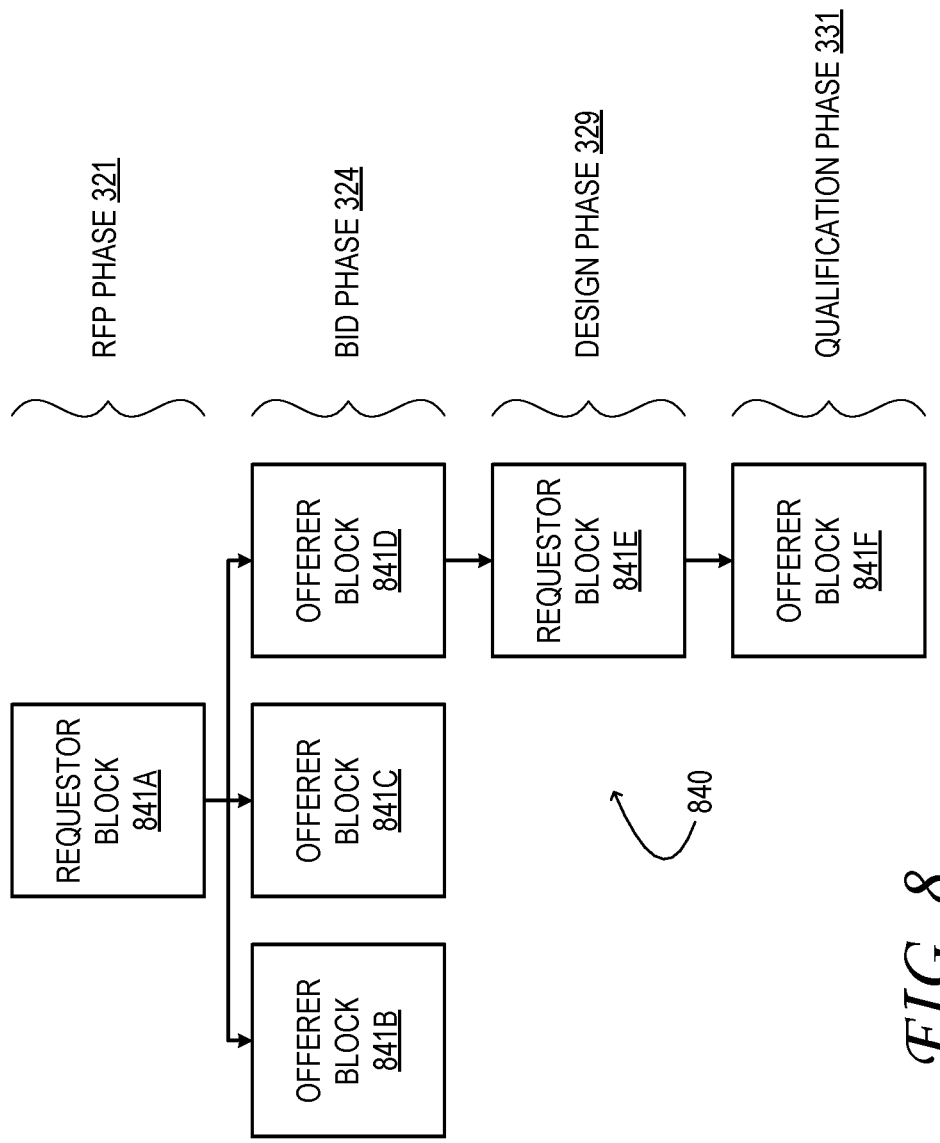
FIG. 8 shows additional aspects of a blockchain in accordance with an example.

FIG. 8 schematically shows aspects of a blockchain 840 that has evolved according to the method of FIG. 7. Requestor block 841A of blockchain 840 is the initial requestor block used to specify one or more product requirements during RFP phase 321 (referring again to the process flow of FIG. 3B). Offerer blocks 841B, 841C, and 841D are blocks provided by three different offerers during bid phase 324. These blocks may include bid specifications from each of the three different offerers. During the subsequent initial-acceptance phase 327 (not shown in FIG. 8), the bid of only one of the offerers is accepted. Acceptance promotes the offerer of block 841D to the approved subset of offerers, making that offerer the supplier of the product. Requestor block 841E with additional requestor data is then provided by the requestor during design phase 329, and, in response, at least one additional offerer block 841F is provided by the offerer. Consistent with the description above, the entirety of blockchain 840 may be private in some examples, with permissioned node access controlled by the requestor. In other examples, blocks 841A through 841D may be public and permissionless, while the remaining blocks are private, with permissioned node access.

The purpose of the additional requestor data in requestor block 841E may vary from one implementation to the next. In some examples, product requirements that were not evident during the RFP phase may emerge later in the procurement process. Such requirements may result from interactions with other aspects of a complex manufacturing process. Although the methods herein are flexible and can allow for changing product requirements, a blockchain is naturally configured to immutably record the details of each change (e.g., the time and the authenticated user (e.g., associated with a digital signature) making the change), and, optionally, whether the change is agreed to by additional parties of interest. For instance, if the robotic fiber-alignment asset of the example hereinabove is required to share a bay of fixed size with another manufacturing tool, but the footprint of the other tool has changed, then the specifications of the fiber-alignment asset may require an update. In other scenarios, product requirements may be updated or refined in order to ensure product, industrial, environmental or occupational safety. One advantage of the blockchain implementation is that a time-stamped record of evolving product requirements can be interrogated by any party belonging to the approved subset—which may be extended to include affiliates of approved offerers (e.g., engineering firms) as well as regulators.

In still other examples, additional requested features specified during the design phase may establish one or more design benchmarks for the design of the requested product. One example design benchmark may include the design of a traveling carriage of the robotic fiber alignment asset, which may be required to be completed before the design of the robotic arm of the fiber-alignment asset begins. Offerer data provided in response to the additional requested features may establish whether a given design benchmark is satisfied in the design of the offered product. Pursuant to requestor access to the offerer data, and depending on whether the design benchmark is satisfied, the requestor may then provide one or more subsequent requestor blocks to specify additional design features. By arranging a series of design benchmarks, the requestor may enforce a product-design sequence intended to support precedence flow and orchestration with other manufacturing activities.

As noted hereinabove, at any point during the qualification phase, at least one requested feature of the requested product may be specified in terms of a result of an automated test procedure to be conducted on the offered product. Accordingly, an offerer block from at least one of the approved subset of offerers may include data that reveals a level of compliance of an offered product with respect to at least one requested feature of the requested product. Such data may be obtained pursuant to conducting the automated test procedure on the offered product and may be encoded within an offerer block of a blockchain. In some examples, the at least one requested feature may include a state of software installation on the requested product. By way of example, a state of software installation may include an indication of whether a given software program and/or resource file associated with a software program is installed on the product. The state of software installation may further include an indication of the update version, creation date, modification date or release number of the software program and/or resource file. Here, the data encoded within the offerer block may confirm the state of software installation on the offered product. In some examples, an automated test procedure may include plural automated tests that are conducted in prescribed sequence.

Figure 9:
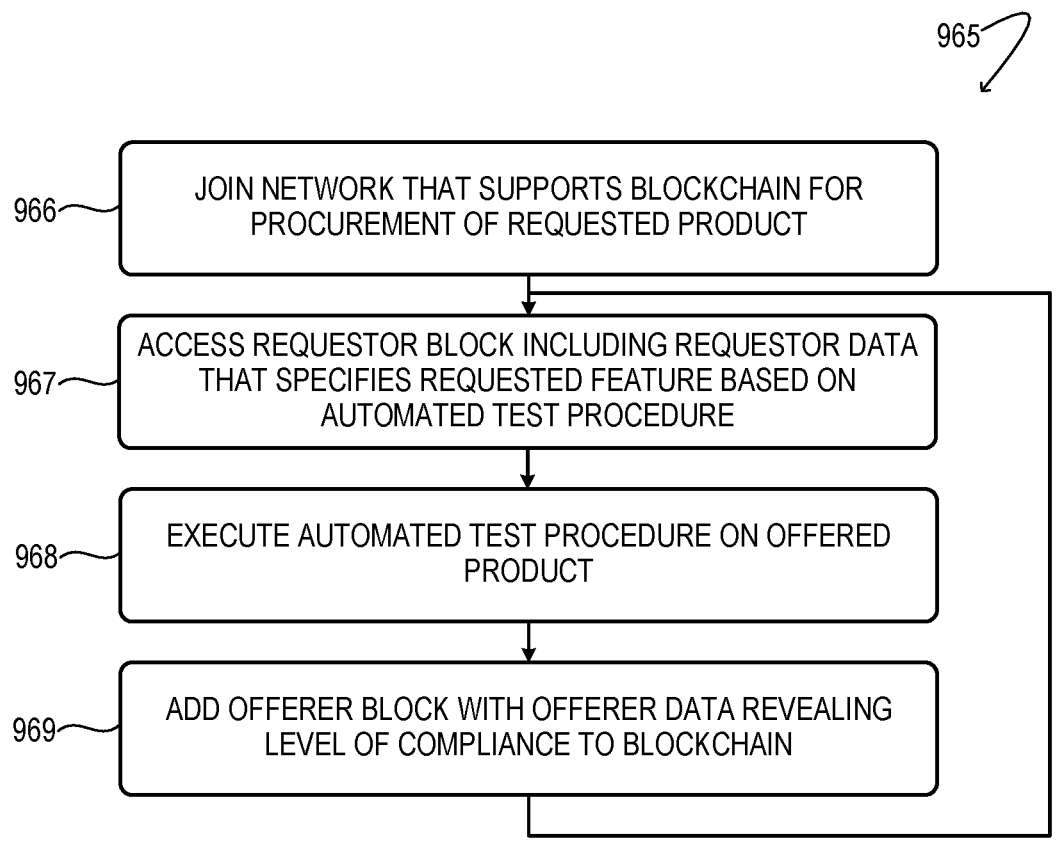
FIG. 9 illustrates aspects of another computer-implemented method to facilitate automated qualification of a manufactured product in accordance with an example.

FIG. 9 illustrates aspects of an example method 965 to facilitate automated qualification of a requested product and other aspects of procurement of the product. Method 965 is illustrated from the point of view of an offerer of the product.

At 966 of method 965, a computer device operated by the offerer joins a network that supports a blockchain having at least one requestor block. As noted above, the at least one requestor block includes requestor data that specifies at least one requested feature of the requested product. The at least one requested feature may be specified based on a result of an automated test procedure to be conducted on the offered product. Neither the nature of the network joined, nor the manner by which the offerer computer device joins the network is particularly limited. The network may be a peer-to-peer network in some implementations. In implementations in which access to the network is permissioned, the offerer computer device may join only after credentials supplied by the requestor are validated by the requestor.

At 967 the computer device operated by the offerer accesses the at least one requestor block in order to receive the requestor data. As noted above, the requestor data may define an automated test procedure to be conducted on the offered product to assess the suitability of the offered product.

At 968 the offerer executes the automated test procedure, as defined in the requestor block, on the offered product.

At 969 the computer device operated by the offerer adds at least one offerer block to the blockchain. The at least one offerer block is cryptographically linked to each of the at least one requestor block, as described hereinabove. In some examples, the at least one offerer block includes offerer data obtained by automated testing of the offered product. The offerer data may reveal a level of compliance of an offered product with respect to the at least one requested feature. In some examples, the offerer data is obtained pursuant to conducting the automated test procedure on the offered product, as defined by the requestor in the requestor block. In these examples, the offerer data includes the result of the automated test procedure. In some examples, the at least one requested feature includes an acceptable tolerance range associated with the result of the automated test procedure. In these examples, the level of compliance may be assessed by comparing the data to the result and associated acceptable tolerance range.

No aspect of the foregoing drawings or description should be interpreted in a limiting sense, because numerous variations, extensions, and omissions are also envisaged. For instance, although this disclosure emphasizes blockchain implementations for executing product-procurement contracts, other network-based approaches are also envisaged. In one example, a network-accessible XML document comprising a series of time-stamped, user-authenticated sections may be used to support the desired exchange of data between the requestor and one or more offers of a product. A cryptographic signature—in addition to any other encrypted data—can be included in an XML file in any suitable encoding (e.g., a Base64 encoding using ASCII characters).

In some implementations, the methods and processes described herein may be tied to a computer system 1070 of one or more computer devices. Such methods and processes may be implemented as an application program or service, an application programming interface (API), a library, and/or other computer-program product.

Figure 10:
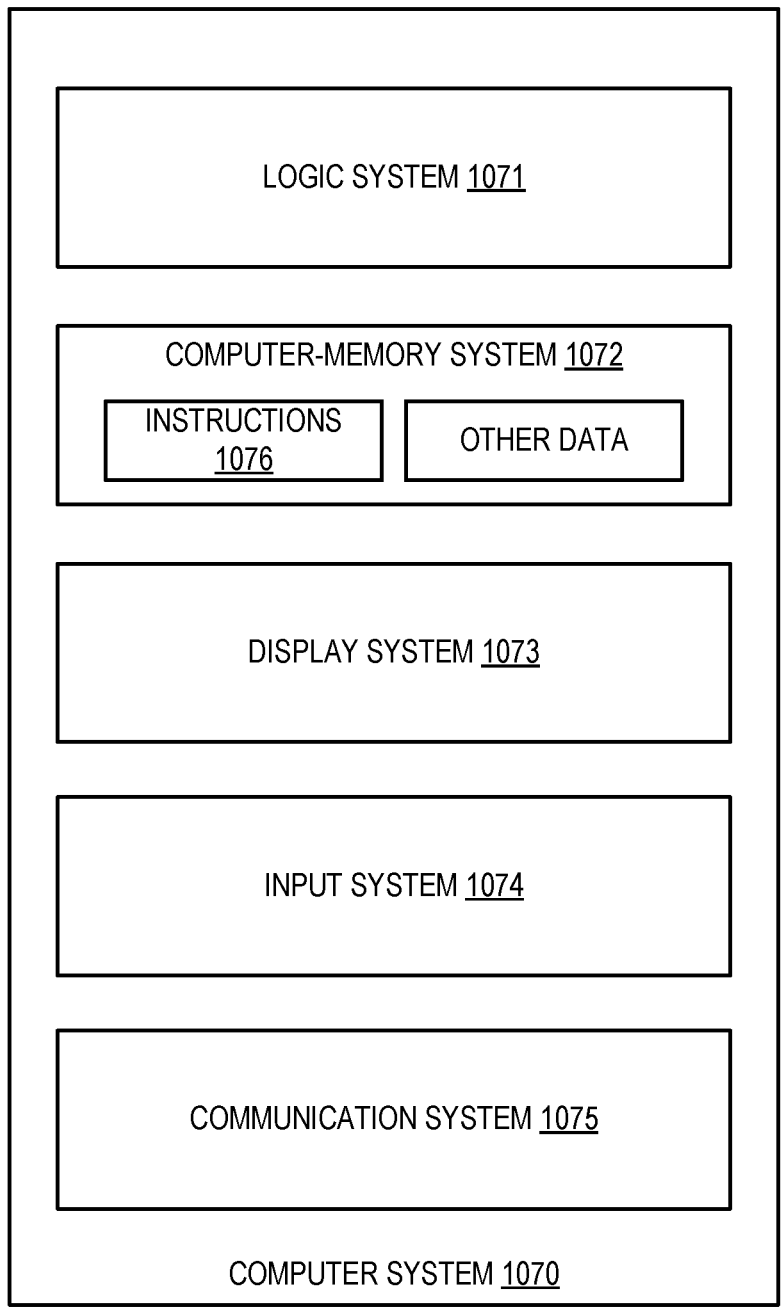
FIG. 10 shows aspects of a computer system configured to facilitate automated qualification of a manufactured product in accordance with an example.

FIG. 10 shows a schematic representation of a computer system 1070 configured to provide any, some, or all of the computer functionality described herein. Computer system 1070 may take the form of at least one personal computer, workstation, network-accessible server computer, tablet computer, mobile communication device (e.g., smart phone), and/or other computer device.

Computer system 1070 includes a logic system 1071 and a computer-memory system 1072. Computer system 1070 may optionally include a display system 1073, an input system 1074, a communication system 1075, and/or other systems not shown in FIG. 10.

Logic system 1071 includes one or more physical devices configured to execute instructions 1076. For example, logic system 1071 may be configured to execute instructions that are part of at least one operating system (OS), application, service, and/or other program construct. Instructions 1076 may be configured so as to cause computer system 1070 to enact any, some, or all operations associated with the computer-implemented methods disclosed herein. The logic system 1071 may include at least one hardware processor (e.g., microprocessor, central processor, central processing unit (CPU) and/or graphics processing unit (GPU)) configured to execute software instructions. Additionally or alternatively, the logic system 1071 may include at least one hardware or firmware device configured to execute hardware or firmware instructions. A processor of the logic system 1071 may be single-core or multi-core, and the instructions executed thereon may be configured for sequential, parallel, and/or distributed processing. Individual components of the logic system 1071 optionally may be distributed among two or more separate devices, which may be remotely located and/or configured for coordinated processing. Aspects of the logic system 1071 may be virtualized and executed by remotely-accessible, networked computing devices configured in a cloud-computing configuration.

Computer-memory system 1072 includes at least one physical device configured to temporarily and/or permanently hold computer information (i.e., data) such as instructions executable by logic system 1071. Instructions held by the computer-memory system 1072 may include instructions 1076. When the computer-memory system 1072 includes two or more devices, the devices may be collocated or remotely located. Computer-memory system 1072 may include at least one volatile, nonvolatile, dynamic, static, read/write, read-only, random-access, sequential-access, location-addressable, file-addressable, and/or content-addressable computer-memory device. Computer-memory system 1072 may include at least one removable and/or built-in computer-memory device. When the logic system 1071 executes instructions, the state of computer-memory system 1072 may be transformed—e.g., to hold different data.

Aspects of logic system 1071 and computer-memory system 1072 may be integrated together into one or more hardware-logic components. Any such hardware-logic component may include at least one program- or application-specific integrated circuit (PASIC/ASIC), program- or application-specific standard product (PSSP/ASSP), system-on-a-chip (SOC), or complex programmable logic device (CPLD), for example.

Logic system 1071 and computer-memory system 1072 may cooperate to instantiate one or more logic machines or engines. As used herein, the terms 'machine' and 'engine' each refer collectively to a combination of cooperating hardware, firmware, software, instructions, and/or any other components that provide computer functionality. In other words, machines and engines are never abstract ideas and always have a tangible form. A machine or engine may be instantiated by a single computer device, or a machine or engine may include two or more subcomponents instantiated by two or more different computer devices. In some implementations, a machine or engine includes a local component (e.g., a software application executed by a computer processor) cooperating with a remote component (e.g., a cloud computing service provided by a network of one or more server computers). The software and/or other instructions that give a particular machine or engine its functionality may optionally be saved as one or more unexecuted modules on one or more computer-memory devices.

In some embodiments, computer system 1070 may include a qualification machine configured to automatically qualify or otherwise analyze and/or validate received data, such as offerer data. As one example, the qualification machine may be configured to determine fiber spacing based on received image/video data.

Machines and engines may be implemented using any suitable combination of machine learning (ML), artificial intelligence (AI), and/or natural language processing (NLP) techniques. Non-limiting examples of techniques that may be incorporated in an implementation of one or more machines include support vector machines, multi-layer neural networks, convolutional neural networks (e.g., spatial convolutional networks for processing images and/or video, temporal convolutional neural networks for processing audio signal and/or natural language sentences, and/or any other suitable convolutional neural network configured to convolve and pool features across one or more temporal and/or spatial dimensions), recurrent neural networks (e.g., long short-term memory networks), associative memories (e.g., lookup tables, hash tables, bloom filters, neural Turing machines and/or neural random-access memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmentable models, and/or super-segmentable models (e.g., hidden dynamic models)).

When included, display system 1073 may be used to present a visual representation of data held by computer-memory system 1072. The visual representation may take the form of a graphical user interface (GUI) in some examples. Display system 1073 may include one or more display devices utilizing virtually any type of technology.

When included, input system 1074 may comprise or interface with one or more input devices. An input device may include a sensor device or a user input device. Examples of user input devices include a keyboard, mouse, or touch screen.

When included, communication system 1075 may be configured to communicatively couple computer system 1070 with one or more other computer systems. Communication system 1075 may include wired and/or wireless communication devices compatible with one or more different communication protocols. The communication system may be configured for communication via personal-, local- and/or wide-area networks.

It will be understood that the configurations and/or approaches described herein are exemplary in nature, and that these specific examples are not to be considered in a limiting sense, because numerous variations are possible. The specific routines or methods described herein may represent one or more of any number of processing strategies. As such, various acts illustrated and/or described may be conducted in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computer device comprising:
a processor; and
operatively coupled to the processor, a computer-memory system holding instructions that, upon execution by the processor, cause the computer device to instantiate a node of a blockchain having verifiable provenance, the blockchain including:
a requestor block configured to specify at least one requested feature of a requested product based on a result of an automated test procedure conducted on an offered product corresponding to the requested product, the at least one requested feature including a design benchmark for the requested product; and
an offerer block cryptographically linked to the requestor block, the offerer block including offerer data that reveals a level of compliance of the offered product with respect to the at least one requested feature, thereby establishing whether the design benchmark is satisfied in the offered product, the offerer data obtained by conducting the automated test procedure on the offered product.

2. The computer device of claim 1 wherein the computer device is a first computer device, and wherein the blockchain is configured to receive the offerer data from a second computer device via an application-programming interface (API) or Microservice Architecture (MSA).

3. The computer device of claim 2 wherein the offerer data as received via the API or MSA is immutably time-stamped and immutably source-authenticated.

4. The computer device of claim 1 wherein the at least one requested feature includes an acceptable tolerance range associated with the result of the automated test procedure, and wherein the level of compliance is assessed by comparing the offerer data to the result and associated acceptable tolerance range.

5. The computer device of claim 1 wherein the at least one requested feature includes a state of software installation on the requested product, and wherein the offerer data confirms a state of software installation on the offered product.

6. The computer device of claim 1 wherein the requestor block is a first requestor block, and wherein the blockchain includes a second requestor block added to the blockchain pursuant to requestor access of the offerer data.

7. A computer-implemented method to facilitate execution of a contract for procurement of a requested product, the method comprising:
provinding, via a network, requestor data that specifies a requested feature of the requested product based on a result of an automated test procedure conducted on an offered product corresponding to the requested product, the requested feature including a design benchmark for the requested product and including an acceptable tolerance range;
extending access to the network to at least one offerer of the requested product, the access including a time-stamped, user-authenticated write permission; and
receiving, via the network, offerer data that reveals a level of compliance of the offered product with respect to the requested feature, thereby establishing whether the design benchmark is satisfied in the offered product, the offerer data obtained by executing the automated test procedure on the offered product.

8. The method of claim 7 wherein the network includes a blockchain, wherein the requestor data is encoded in a requestor block of the blockchain, wherein the offerer data is encoded in an offerer block of the blockchain, and wherein the offerer block is cryptographically linked to the requestor block.

9. The method of claim 8 further comprising exchanging data between the blockchain and a computer device via an application-programming interface (API) or Micro service Architecture (MSA), wherein the API or MSA provides a template for each new block to be added to the blockchain.

10. The method of claim 8 further comprising accessing the blockchain via a user interface (UI) executed on the computer device or on a different computer device.

11. The method of claim 10 wherein the UI is configured to control an access permission of one or more nodes of the blockchain to data of the blockchain.

12. The method of claim 10 wherein the UI is configured to facilitate addition of a new block to the blockchain.

13. The method of claim 10 wherein the UI is configured to facilitate entry of data to one or more blocks of the blockchain.

14. The method of claim 7 wherein the acceptable tolerance range includes one or more of an engineering-tolerance range and a process-tolerance range.

15. The method of claim 7 wherein the requested feature includes a state of software installation on the requested product, and wherein the offerer data confirms a state of software installation on the offered product.

16. A computer-implemented method to facilitate execution of a contract for procurement of a requested product, the method comprising:
publishing a requestor block on a blockchain extending initial access permission to offerers of the requested product, the requestor block being configured to specify at least one requested feature of the requested product based on a result of an automated test procedure conducted on an offered product corresponding to the requested product, the at least one requested feature including a design benchmark for the requested product;
accessing the blockchain to receive a plurality of offerer blocks cryptographically linked to the requestor block, each of the plurality of offerer blocks published by an offerer of the requested product;
providing continued access permission to the blockchain to an approved subset of the offerers of the requested product; and
accessing the blockchain to receive a subsequent offerer block from at least one of the approved subset of the offerers of the requested product, the subsequent offerer block including offerer data obtained by conducting the automated test procedure on the offered product and revealing a level of compliance of the offered product with respect to the at least one requested feature of the requested product, thereby establishing whether the design benchmark is satisfied in the offered product.

17. The method of claim 16 wherein providing continued access permission to the blockchain includes pruning the blockchain onto an access-restricted blockchain.

18. The method of claim 16 wherein providing continued access permission to the blockchain includes restricting the continued access permission to the blockchain from offerers not within the approved subset of the offerers of the requested product.

19. The method of claim 16 wherein the requestor block includes a bid request, and wherein each of the plurality of offerer blocks includes a bid specification.

20. The method of claim 16 wherein the at least one requested feature includes an acceptable tolerance range associated with the result of the automated test procedure and wherein the level of compliance is assessed by comparing the offerer data to the result and associated acceptable tolerance range.

21. The method of claim 16 wherein the at least one requested feature includes a state of software installation on the requested product, and wherein the offerer data confirms a state of software installation on the offered product.

22. A computer-implemented method to facilitate execution of a contract for procurement of a requested product, the method comprising:
joining a network that supports a blockchain having at least one requestor block, wherein the at least one requestor block includes requestor data that specifies at least one requested feature of the requested product based on a result of an automated test procedure conducted on an offered product corresponding to the requested product, the at least one requested feature including a design benchmark for the requested product;
accessing the at least one requestor block to receive the requestor data; and
adding to the blockchain at least one offerer block cryptographically linked to each of the at least one requestor block, wherein the at least one offerer block includes offerer data obtained by conducting the automated test procedure on the offered product and revealing a level of compliance of the offered product with respect to the at least one requested feature, thereby establishing whether the design benchmark is satisfied in the offered product.

23. The method of claim 22 wherein the at least one requested feature includes an acceptable tolerance range associated with the result of the automated test procedure, and wherein the level of compliance is assessed by comparing the offerer data to the result and associated acceptable tolerance range.

\* \* \* \* \*